(12) United States Patent
Shirota et al.

(10) Patent No.: US 7,532,557 B2
(45) Date of Patent: May 12, 2009

(54) RECORDING PULSE GENERATING APPARATUS AND INFORMATION RECORDING APPARATUS

(75) Inventors: Akira Shirota, Tokorozawa (JP); Kunihiko Horikawa, Tokorozawa (JP); Hiroyuki Uchino, Tokorozawa (JP); Yoshio Sasaki, Tokorozawa (JP); Shoji Taniguchi, Tokorozawa (JP); Eiji Muramatsu, Tokorozawa (JP)

(73) Assignee: Pioneer Corporation, Meguro-ku, Tokyo (JP)

( * ) Notice: Subject to any disclaimer, the term of this patent is extended or adjusted under 35 U.S.C. 154(b) by 228 days.

(21) Appl. No.: 11/730,063

(22) Filed: Mar. 29, 2007

(65) Prior Publication Data
US 2007/0217311 A1 Sep. 20, 2007

Related U.S. Application Data

(63) Continuation of application No. 10/594,527, filed as application No. PCT/JP2005/006148 on Mar. 30, 2005.

(30) Foreign Application Priority Data
Mar. 31, 2004 (JP) ............................ P2004-105258

(51) Int. Cl.
*G11B 20/10* (2006.01)
(52) U.S. Cl. .................................. 369/59.12; 369/53.26
(58) Field of Classification Search .................. None
See application file for complete search history.

(56) References Cited

U.S. PATENT DOCUMENTS

| 2003/0067857 A1 | 4/2003 | Shirota et al. |
| 2005/0169148 A1 | 8/2005 | Noguchi et al. |

FOREIGN PATENT DOCUMENTS

| CN | 2574170 | 9/2003 |
| EP | 0 932 144 | 7/1999 |
| EP | 1 111 596 | 6/2001 |
| EP | 1 347 444 | 9/2003 |
| EP | 1 351 225 | 10/2003 |
| EP | 1 607 945 | 12/2005 |
| JP | 61-216126 | 9/1986 |
| JP | 2-29928 | 1/1990 |
| JP | 2001-110052 | 4/2001 |
| JP | 2002-269744 | 9/2002 |

(Continued)

*Primary Examiner*—Paul Huber
(74) *Attorney, Agent, or Firm*—Drinker Biddle & Reath LLP

(57) ABSTRACT

The present invention provides a recording pulse generating apparatus capable of forming a recording pit having a proper shape even at the time of ultra-high-speed recording of, for example, 8× recording or higher.

A recording controller 10 for generating recording pulse signals having lengths corresponding to ten kinds of lengths of pits formed at the time of recording information has a recording controller 10 for generating the recording pulse signals so that the amplitude of a recording pulse signal corresponding to a pit having a length of 4T changes from a first amplitude to a second amplitude, and generating the recording pulse signals so that the amplitude of a recording pulse signal corresponding to a pit having a length of 5T or longer changes from a third amplitude to a fourth amplitude and further changes to a fifth amplitude.

7 Claims, 7 Drawing Sheets

FOREIGN PATENT DOCUMENTS

| | | |
|---|---|---|
| JP | 2003-085753 | 3/2003 |
| JP | 2004-241015 | 8/2004 |
| JP | 2004-303400 | 10/2004 |
| JP | 2005-11491 | 1/2005 |
| JP | 2005-020217 | 3/2005 |
| JP | 2005-276240 | 10/2005 |

RECORDING PULSE GENERATING APPARATUS AND INFORMATION RECORDING APPARATUS

This is a continuation application of copending application Ser. No. 10/594,527, having a § 371 date of Sep. 28, 2006, which is a national stage filing based on PCT International Application No. PCT/JP2005/006148, filed on Mar. 30, 2005. The copending application Ser. No. 10/594,527 is incorporated by reference herein in its entirety.

TECHNICAL FIELD

The present application belongs to a technical field of a recording pulse generating apparatus and an information recording apparatus.

BACKGROUND ART

In an information recording process on a writable or rewritable optical disc such as a DVD-R (DVD-Recordable) or DVD-RW (DVD-Re-recordable) as an information recording medium having large recording capacity which is used more and more commonly in recent years, a laser power control method of forming recording pits with a laser pulse train including a plurality of short laser pulses is used. Such a method is also called a write strategy method.

The laser pulse train is made of a plurality of laser pulses whose amplitudes vary between a predetermined read power level and a write (recording) power level. Specifically, according to a recording signal, in a region (hereinbelow, also properly called "space part") on a recording surface of an optical disc in which no recording pits are formed, the recording surface is irradiated with a laser beam at a read power. In a region (hereinbelow, also properly called "pit part") on a recording surface in which recording pits are to be formed, the recording surface is irradiated with a laser beam at a power according to a laser pulse train whose amplitude varies between the read power and the write power, thereby forming recording pits on the recording surface.

In recent years, as an example of the write strategy method, a technique disclosed in Patent Document 1 has been also proposed. Patent Document 1: Japanese Patent Application Laid-open No. 2003-85753 (FIGS. 5, 6, and 12)

DISCLOSURE OF THE INVENTION

Problems to be Solved by the Invention

In a conventional configuration for generating recording pulse signals disclosed in the Patent Document 1, at the time of generating a recording pit having a length less than a pre-set length, a laser pulse of a single pulse is used. At the time of generating a recording pit having a length equal to or longer than the pre-set length, a laser pulse having a concave shape or a laser pulse having an L shape is used. As a result, at the time of generating a recording pit having a length less than the pre-set length, a recording pit is formed at a predetermined high write power level whose absolute value is large. On the other had, at the time of generating a recording pit equal to or longer than the pre-set length onto the recording surface, recording pits are formed at a write power level which varies in a plurality of stages between the write power level and a predetermined write power level lower than the write power level.

Generally, accumulation of heat energy received from the write power varies between the case where recording pits are generated only with the write power whose absolute value is large and the case where recording pits are generated with a write power which varies in a plurality of stages between the write power of the large absolute value and a write power of the smaller absolute value.

Consequently, in the technique described in the Patent Document 1, when the write power varies due to a change in the characteristic of a current-power (I-P) curve (gradient in the I-P curve) shown in FIG. 4 of the Patent Document 1 or the like, the fluctuation amount in the heat energy accumulation varies between the recording pits formed with the single pulse and the recording pits formed with the recording power that varies in a plurality of stages. There is a problem that fluctuations in the shapes of the recording pit become larger.

The problem conspicuously appears in the case where recording is performed at higher speed.

The present application has been made in consideration of the problem. An object of the invention is to provide a recording pulse generating apparatus suitably used at the time of performing recording at higher speed (for example, 8× speed) and an information recording apparatus including the recording pulse generating apparatus and for recording information onto an information recording medium such as an optical disc.

Means for Solving the Problem

In order to solve the above problems, the invention of claim 1 relates to a recording pulse generating apparatus for generating recording pulse signals having pulse widths corresponding to pits having various lengths, comprising:

first pulse generating means for generating the recording pulse signal so that an amplitude of the recording pulse signal corresponding to a pit having at least one kind of length less than a preset length changes from a first amplitude to a second amplitude lower than the first amplitude; and second pulse generating means for generating the recording pulse signal so that an amplitude of the recording pulse signal corresponding to a pit having a length equal to or longer than the pre-set length changes from a third amplitude to a fourth amplitude lower than the third amplitude and further changes to a fifth amplitude higher than the fourth amplitude.

In order to solve the above problems, the invention of claim 8 relates to an information recording apparatus comprising:

the recording pulse generating apparatus according to claim 1, and recording means for recording the information by forming the pit using the recording pulse signal generated.

BRIEF DESCRIPTION OF THE DRAWINGS

FIG. 5A is a diagram wing a first recording pulse waveform, and FIG. 5B is a diagram wing a second recording pulse waveform.

Figure 1:
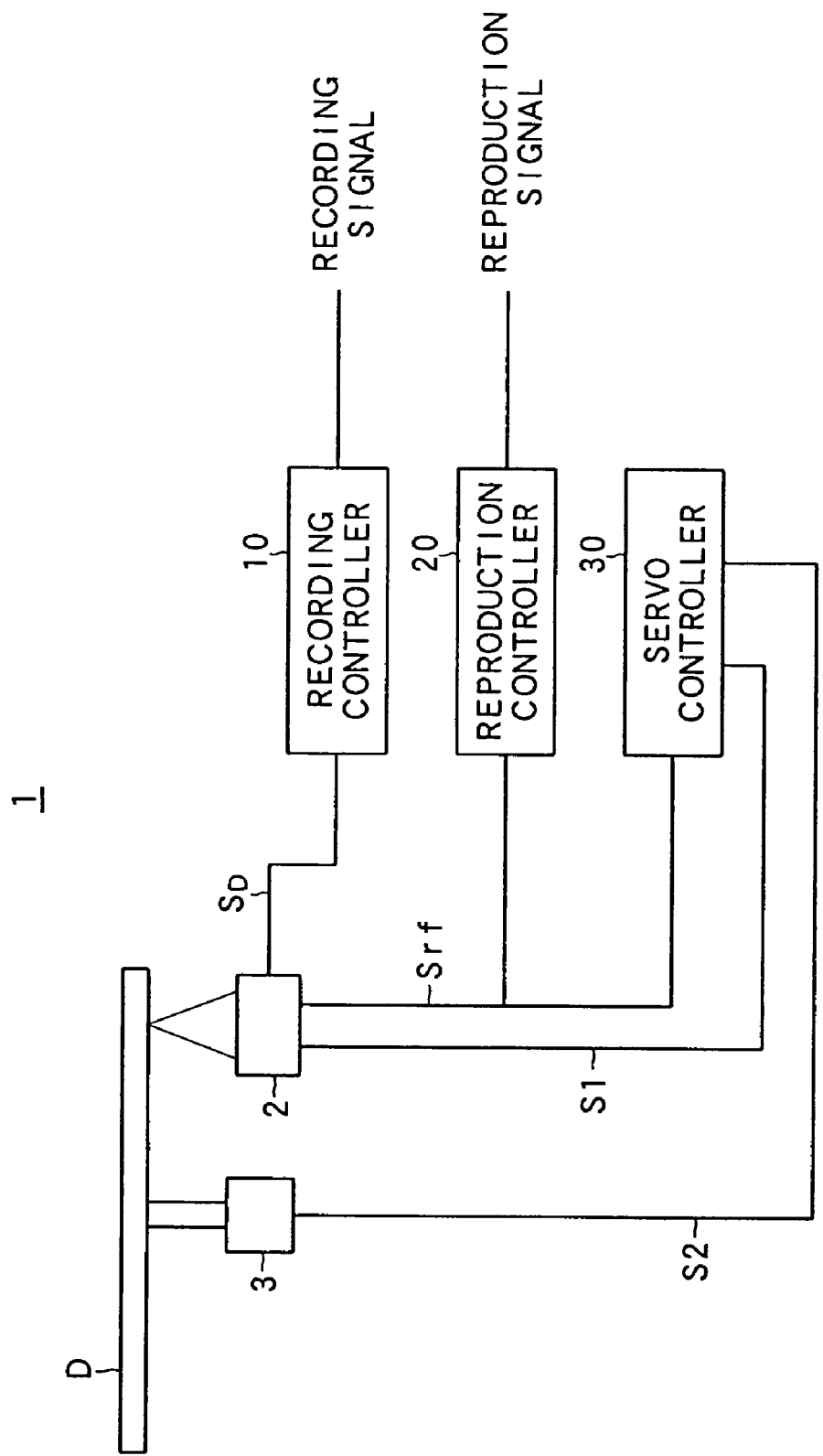
FIG. 1 is a block diagram showing a schematic configuration of an information recording/reproducing apparatus according to embodiments.

DESCRIPTION OF REFERENCE NUMERALS 1 information recording/reproducing apparatus
2 optical pickup
3 spindle motor
10 recording controller
12 LD driver
13 APC circuit
14 sample and hold circuit
15 controller
16 front monitor diode
17R, 17W1, 17W2 current sources
18R, 18W1, 18W2 switches
20 reproduction controller
30 servo controller
40 top pulse
41 intermediate bias part
42 last pulse

BEST MODE FOR CARRYING OUT THE INVENTION

Preferred embodiments of the present application will be described with reference to the drawings.

(I) Apparatus Configuration

Figure 2:
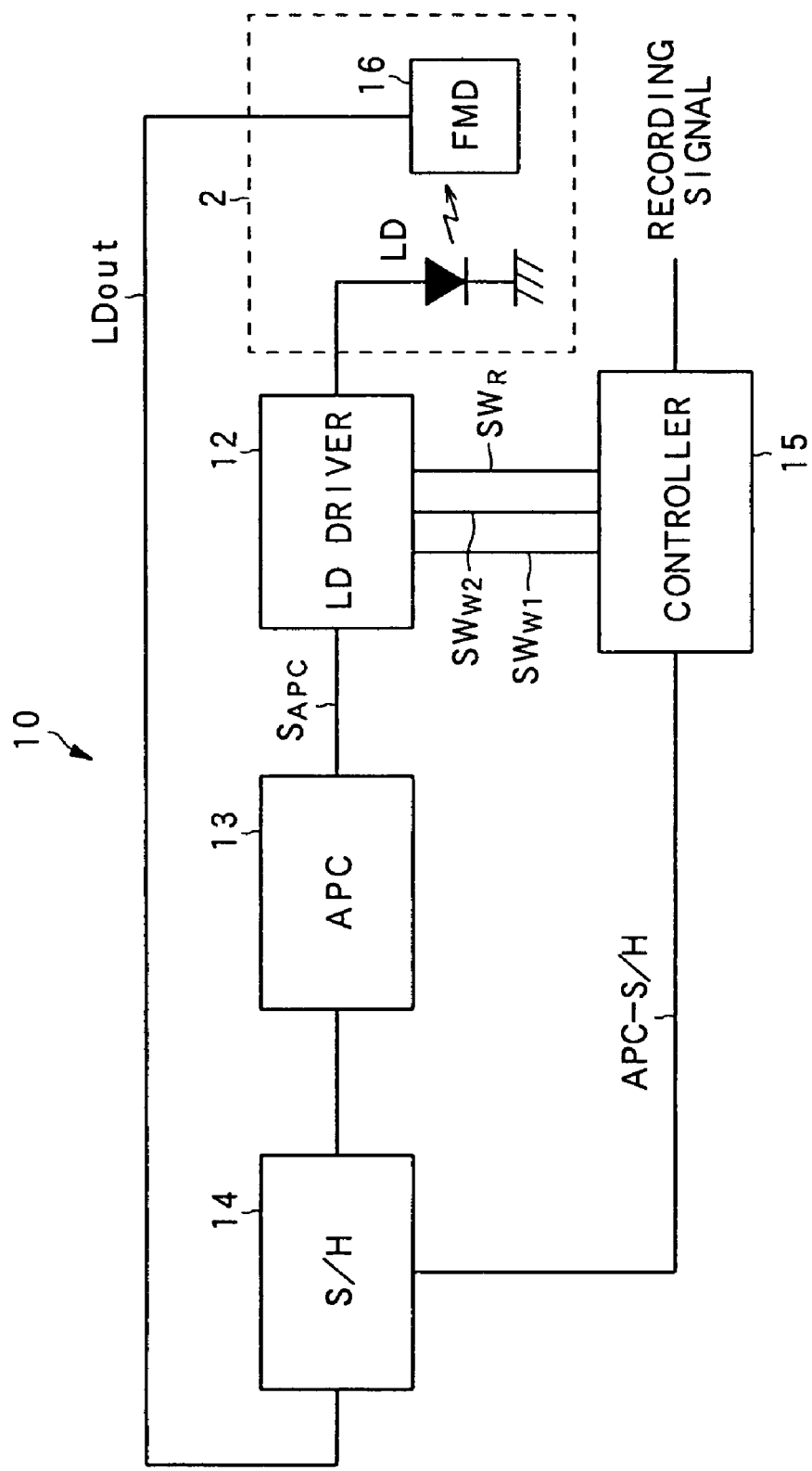
FIG. 2 is a block diagram showing an outline configuration of a recording controller in the information recording/reproducing apparatus according to the embodiments.
Figure 3:
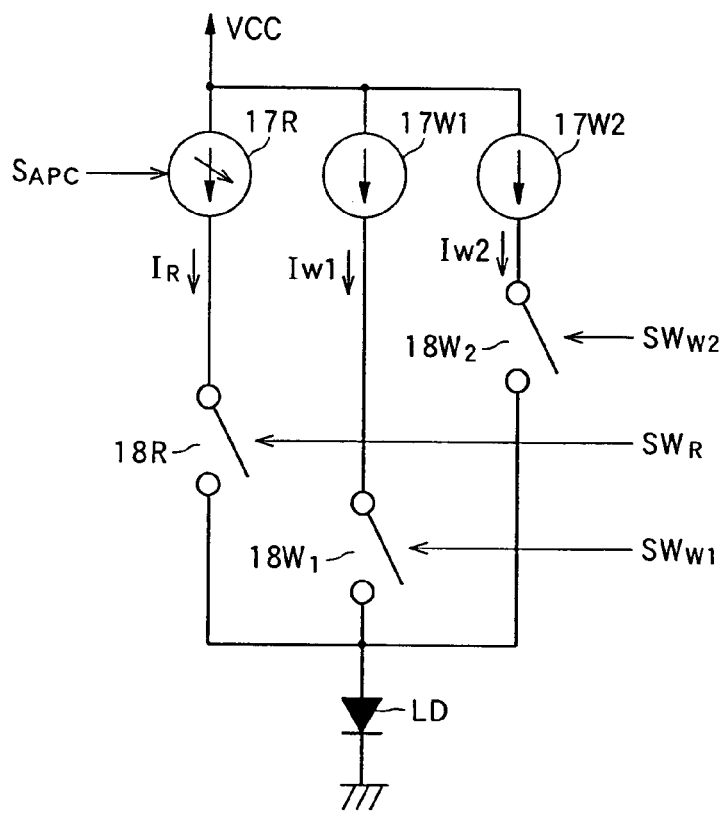
FIG. 3 is a diagram showing an outline configuration of an LD driver in the information recording/reproducing apparatus according to the embodiments.
Figure 4:
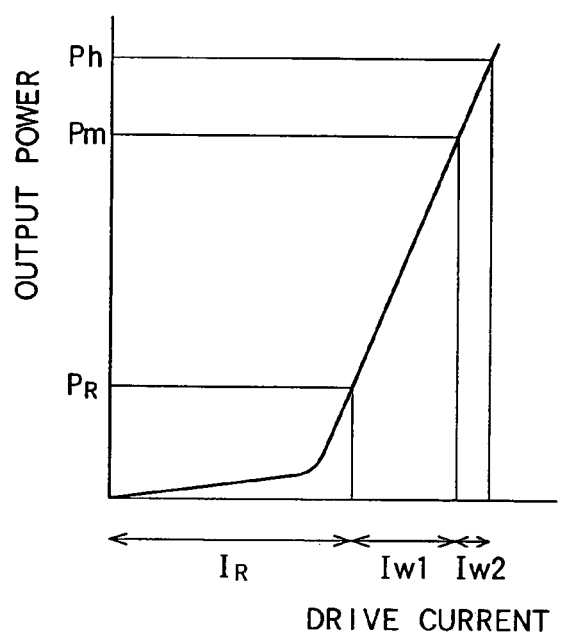
FIG. 4 is a graph showing an example of the relation between drive current supplied to a laser diode and output power.

First, an apparatus configuration and operation which are common to the following embodiments will be described with reference to FIGS. 1 to 4. FIG. 1 is a block diagram showing a schematic configuration of an information recording/reproducing apparatus according to embodiments. FIG. 2 is a block diagram showing an outline configuration of a recording controller in the information recording/reproducing apparatus. FIG. 3 is a diagram showing an outline configuration of an LD (Laser Diode) driver in the information recording/reproducing apparatus. FIG. 4 is a graph showing an example of the relation between drive current supplied to a laser diode and output power.

As shown in FIG. 1, an information recording/reproducing apparatus 1 according to embodiments is an apparatus for recording/reproducing information to/from an optical disc D. As the optical disc D, various optical discs such as a CD-R (Compact Disc-Recordable) or a DVD-R on which information can be recorded only once and a CD-RW (Compact Disc-Rewritable) or a DVD-RW from/to which information can be erased/recorded a plurality of times can be used.

The information recording/reproducing apparatus 1 has: an optical pickup 2 as recording means for irradiating the optical disc D with a recording beam and a reproduction beam; a spindle motor 3 for controlling rotation of the optical disc D; a recording controller 10 as first pulse generating means and second pulse generating means for controlling recording of information onto the optical disc D; a reproduction controller 20 for controlling reproduction of information already recorded on the optical disc D; and a servo controller 30 for performing various servo controls including spindle servo for controlling rotation of the spindle motor 3 and focus servo and tracking servo as relative position controls on the optical disc D of the optical pickup 2.

Next, the operation will be described.

The recording controller 10 receives a recording signal, generates a drive signal $S_D$ for driving a laser diode in the optical pickup 2 by a process which will be described later, and supplies the drive signal $S_D$ to the optical pickup 2.

The reproduction controller 20 receives a read RF signal Srf output from the optical pickup 2, performs predetermined demodulating process, decoding process, or the like on the read RF signal Srf, thereby generating a reproduction signal, and outputs the reproduction signal.

The servo controller 30 receives the read RF signal Srf from the optical pickup 2, supplies servo signals $S_1$ such as a tracking error signal and a focus error signal to the optical pickup 2 on the basis of the read RF signal Srf, and supplies a spindle servo signal $S_2$ to the spindle motor 3. In response to the signals, various servo processes such as tracking servo, focus servo, and spindle servo are executed.

The present application relates to the recording method in the recording controller 10, and various known methods can be applied to the reproduction control and the servo control, so that they will not be described in detail. Although FIG. 1 illustrates the information recording/reproducing apparatus as an embodiment of the present application, the present invention can be also applied to an information recording apparatus dedicated to recording.

The internal configuration of the optical pickup 2 and the recording controller 10 will now be described with reference to FIG. 2.

As shown in FIG. 2, the optical pickup 2 has a laser diode LD for generating a recording beam for recording information onto the optical disc D and a reproduction beam for reproducing information from the optical disc D, and a front monitor diode (FMD) 16 for receiving the laser beam emitted from the laser diode LD and outputting a laser power level signal LDout corresponding to the laser beam.

The optical pickup 2 has known components such as a photodetector for receiving a reflection beam from the optical disc D of the reproduction beam and generating the read RF signal Srf and an optical system for guiding the recording beam, the reproduction beam, and the reflection beam to proper directions. The components are not shown and will not be described in detail.

The recording controller 10 has an LD driver 12, an APC (Automatic Power Control) circuit 13, a sample and hold (S/H) circuit 14, and a controller 15.

The LD driver 12 supplies a current according to the recording signal to the laser diode LD to record information onto the optical disc D.

The front monitor diode 16 is disposed near the laser diode LD in the optical pickup 2, receives the laser beam emitted from the laser diode LD, and outputs the laser power level signal LDout indicative of the level of the laser beam.

Next, the sample and hold circuit 14 samples and holds the level of the laser power level signal LDout at timings specified by a sample and hold signal APC-S/H.

On the basis of an output signal of the sample and hold circuit 14, the APC circuit 13 controls the power of the LD driver 12 so that the read power level of a laser beam emitted from the laser diode LD becomes constant.

On the other hand, the controller 15 mainly controls recording operation and APC operation.

First, the recording operation will be described.

In the recording operation, the controller 15 generates switch signals $SW_R$, $SW_{W1}$, and $SW_{W2}$ for a switch that controls the amount of current supplied to the laser diode LD and supplies the signals to the LD driver 12.

The detailed configuration of the LD driver 12 will be described with reference to FIG. 3.

As shown in FIG. 3, the LD driver 12 has a current source 17R for the read level, and current sources 17W1 and 17W2 and switches 18R, 18W1 and 18W2 for the write level.

The current source 17R for the read level is a current source for passing drive current $I_R$ for making the laser diode LD emit a laser beam at the read power, and the drive current $I_R$ is supplied to the laser diode LD via the switch 18R. Therefore, by turning on the switch 18R, the drive current $I_R$ of the read power is supplied to the laser diode LD. By turning off the switch 18R, supply of the drive current $I_R$ is stopped. The magnitude of the drive current $I_R$ from the current source 17R changes according to a control signal $S_{APC}$.

On the other hand, the current sources 17W1 and 17W2 for the write level are current sources for passing drive currents $I_{W1}$ and $I_{W2}$ for making the laser diode LD emit a laser beam at the write power. The drive current $I_{W1}$ is supplied to the laser diode LD via the switch 18W1, and the drive current $I_{W2}$ is supplied to the laser diode LD via the switch 18W2.

In the write strategy of the application concerned, write powers in two levels, that is, a first write power Ph and a second write power Pm lower (having smaller amplitude) than the first write power Ph are used.

When the switch 18W1 is turned on in a state where the switch 18R is on, the total drive current of the drive currents $I_R$ and $I_{W1}$ is supplied to the laser diode LD, so that the laser diode is driven at the second write power Pm.

When the switch 18W2 is turned on in a state where the switches 18R and 18W1 are on, the drive current $I_{W2}$ is further supplied to the laser diode LD. As a result, the total drive current of the drive currents $I_R$, $I_{W1}$, and $I_{W2}$ flows in the laser diode LD, and the laser diode LD is driven at the first write power Ph. When the switch 18W1 is turned off, supply of the drive current $I_{W1}$ is stopped. When the switch 18W2 is turned off, supply of the drive current $I_{W2}$ is stopped.

Next, the relation between the drive current supplied to the laser diode LD and output power of a laser beam emitted from the laser diode LD will be concretely described by using FIG. 4.

As understood from FIG. 4, when the drive current $I_R$ is supplied to the laser diode LD, the laser beam is emitted at the read power $P_R$. When the drive current $I_{W1}$ is added in the state, a laser beam is emitted at the second write power Pm. When the drive current $I_{W2}$ is further applied, a laser beam is emitted at the first write power Ph.

At the time of recording information onto the optical disc D, basically, the drive current $I_R$ is always supplied and a laser beam is emitted at the read power $P_R$. Further, by adding the drive currents $I_{W1}$ and $I_{W2}$ in accordance with a recording pulse, the first write power Ph or the second write power Pm is applied, and information is recorded on the optical disc.

Next, the APC operation will be described.

The APC operation is performed to adjust the drive current level supplied from the LD driver 12 to the laser diode LD so that the level of the read power of the laser beam which is output from the laser diode LD becomes constant.

More specifically, a drive signal $S_D$ from the LD driver 12 is adjusted so that the level of the read power becomes constant during long space periods (for example, space periods of 5T to 11T and 14T) in spaces of recording signals (subjected to 8-16 modulation and having pit periods and space periods of 3T to 11T and 14T).

More concretely, the operation is performed as follows.

The controller 15 generates a recording pulse corresponding to a recording signal as described above, drives the LD driver 12 by the recording pulse, and makes the laser diode LD emit a laser beam.

In this case, the front monitor diode 16 is disposed near the laser diode LD in the optical pickup 2, receives the laser beam emitted from the laser diode LD, generates the laser power level signal LDout indicative of the level, and supplies the laser power level signal LDout to the sample and hold circuit 14.

The sample and hold circuit 14 samples the laser power level signal LDout supplied from the front monitor diode 16 at the timing given by the sample and hold signal APC-S/H input from the controller 15, and holds the level for a predetermined period. The sample and hold signal APC-S/H output from the controller 15 is a pulse indicative of a period in which the APC is executed (called "APC period").

The sample and hold circuit 14 holds the level of the laser power level signal LDout and supplies it to the APC circuit 13 in the APC period in the space period of the recording signal. The APC circuit 13 supplies the control signal $S_{APC}$ to the LD driver 12 so that the level of the laser power level signal LDout becomes constant in the APC period.

The control signal $S_{APC}$ is input to the current source 17R for the read level in the LD driver 12 as shown in FIG. 3. According to the control signal $S_{APC}$, the current $I_R$ flowing from the current source 17R for the read level changes. That is, the APC operation is executed so that the read power level obtained by the laser diode LD becomes constant.

(II) First Embodiment

Figure 5A:
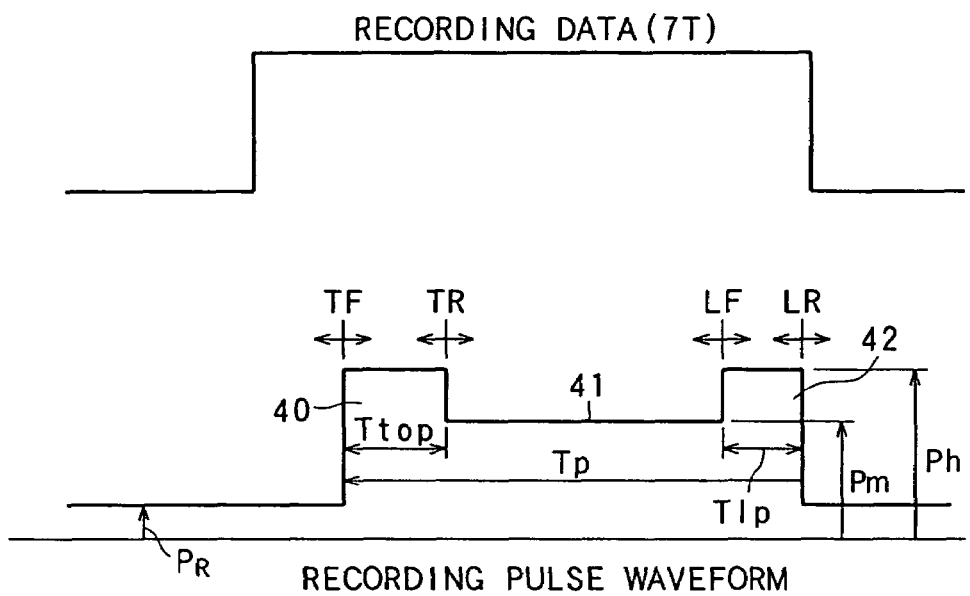
FIGS. 5A and 5B are diagrams showing a recording pulse waveform according to a first embodiment.
Figure 5B:
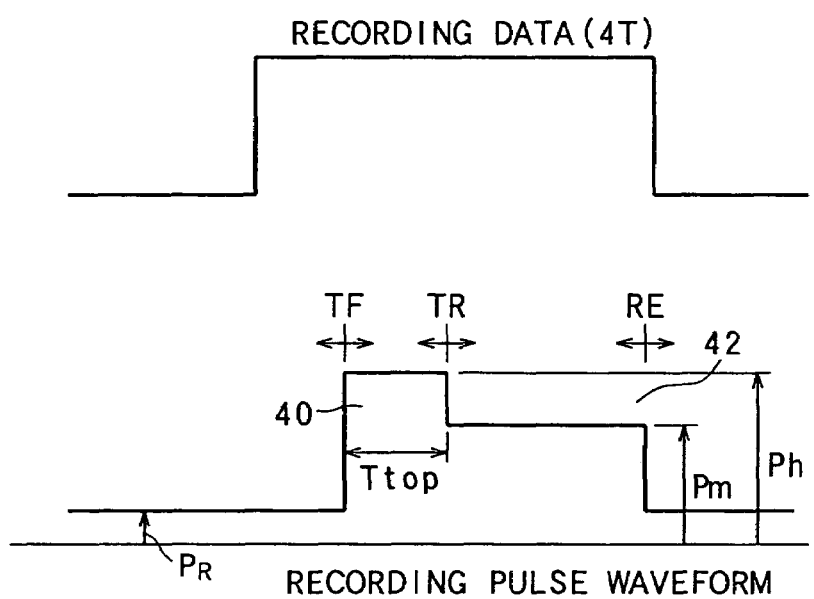
Figure 6:
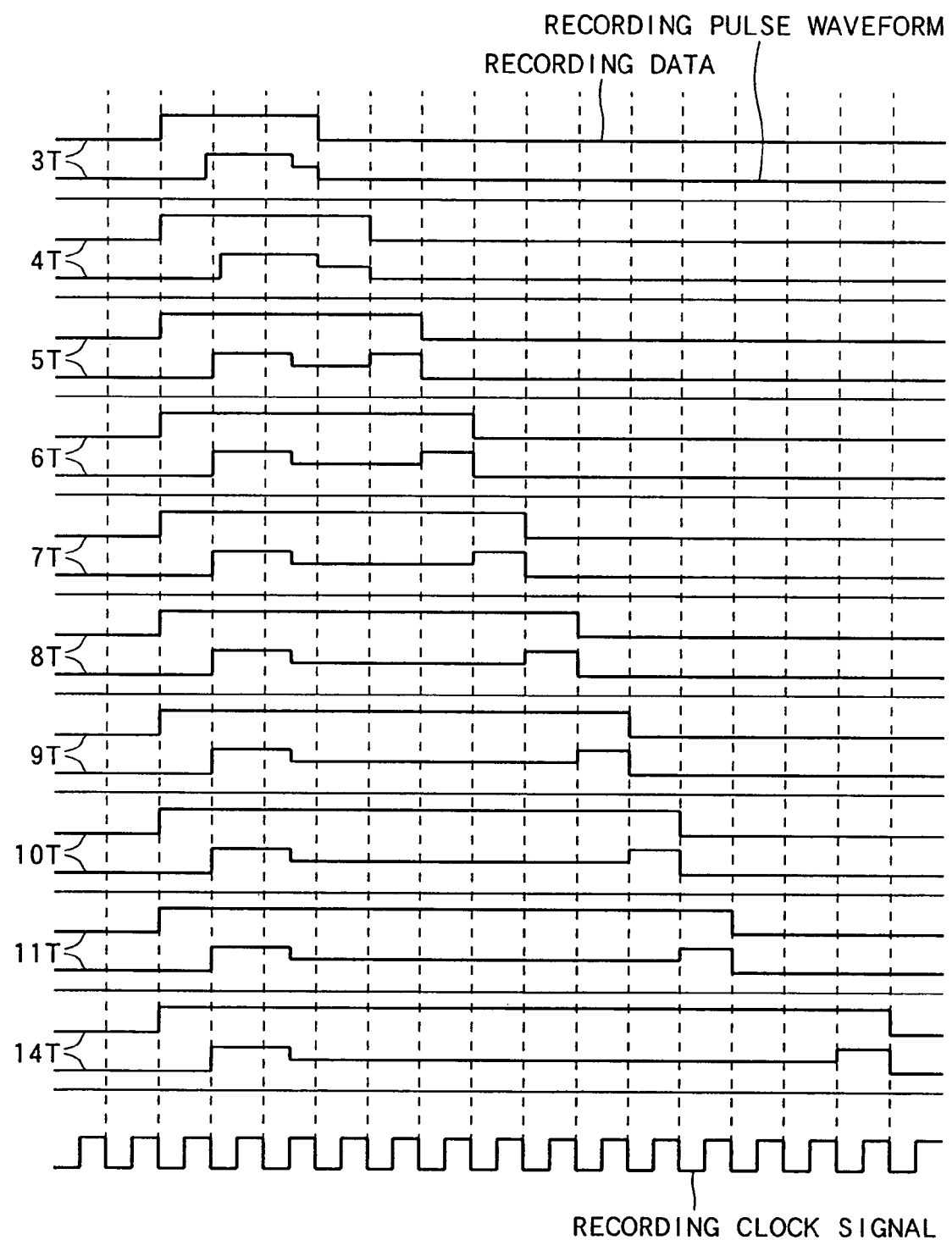
FIG. 6 is a diagram showing recording pulse waveforms corresponding to recording pits in the first embodiment.

Next, a first embodiment of the write strategy method according to the present invention, which is executed by the above-described information recording/reproducing apparatus 1 will be concretely described with reference to FIGS. 5A and 5B and FIG. 6. FIGS. 5A and 5B are diagrams showing two kinds of recording pulse waveforms according to the first embodiment. FIG. 6 is a diagram showing recording pulse waveforms corresponding to recording bits according to the first embodiment.

In the write strategy method according to the first embodiment to be described below, the recording pulse wave of a recording pulse signal for forming a recording pit having a length equal to or longer than a pre-set length (5T in the case of the first embodiment) is set as the first recording pulse waveform shown in FIG. 5A. On the other hand, the recording pulse wave of a recording pulse signal for forming a recording pit having a length less than the pre-set length is set as a second recording pulse waveform shown in FIG. 5B.

First, the first recording pulse waveform of the write strategy method according to the first embodiment will be described with reference to FIG. 5A.

As shown in FIG. 5A, the first recording pulse waveform in the write strategy method according to the first embodiment is constructed by three parts of a top pulse 40, an intermediate bias part 41, and a last pulse 42. In the part other than the above parts, the recording pulse waveform is maintained at the level of the read power $P_R$.

As understood from FIG. 5A, in the first recording pulse waveform, a binary write power is used. For the top pulse 40 and the last pulse 42, the first write power Ph is used. For the intermediate bias part 41, the second write power Pm is used. The second write power Pm is set to be higher than the read power $P_R$ but to be lower than the first write power Ph.

In FIG. 5A, the write powers for the top pulse 40 and the last pulse 42 do not have to be set to the same but may be set separately so that the optimum recording characteristic can be obtained according to the space lengths before and after a recording pit, and the like.

The top pulse 40 has the role of pre-heating the recording surface of the optical disc D for pit recording. The intermediate bias part 41 changes its time width in accordance with the length of a pit to be recorded. The last pulse 42 has the role of adjusting the shape of mainly the rear end part of a pit.

Basically, the length of a pit to be recorded is controlled by top pulse width Ttop, last pulse width Tlp, and the first write power Ph, and the width of a pit to be recorded is controlled by the second write power Pm.

Next, the second recording pulse waveform in the write strategy method according to the first embodiment will be described with reference to FIG. 5B.

The first recording pulse waveform has the top pulse 40, the intermediate bias part 41, and the last pulse 42. As the second recording pulse waveform, by omitting the last pulse 42 and extending the intermediate bias part 41, a recording pulse waveform as shown in FIG. 5B is obtained. In other words, in the second recording pulse waveform, there is no last pulse 42 and the intermediate bias part 41 at the amplitude level corresponding to the second write power Pm continues to the end of the recording pulse waveform.

Preferably, the time of the top pulse 40 in the second pulse waveform is longer than that of the top pulse 40 in the first pulse waveform. Even when the time of the top pulse 40 in the second pulse waveform is about the same or shorter than that of the top pulse 40 in the first pulse waveform, by properly adjusting the start end of the top pulse 40 and the termination end of the intermediate bias part 41, the recording pulse waveform is optimized.

Next, the write power will be concretely described. In the second recording pulse waveform, the amplitude level of the top pulse 40 corresponds to the first write power Ph, and the amplitude level of the intermediate bias part 41 corresponds to the second write power Pm. The part other than the top pulse 40 and the intermediate bias part 41 has an amplitude level corresponding to the read power $P_R$.

Next, the recording pulse waveform corresponding to the length of a pit to be recorded will be described with reference to FIG. 6.

In FIG. 6, recording data is subjected to 8-16 modulation process and has pit periods and space periods having lengths of 3T to 11T and 14T. In the first embodiment, in the case of recording data of 3T and 4T, the second recording pulse waveform is obtained. The amplitude of the top pulse 40 corresponds to the first write power Ph and, on the other hand, the amplitude of the intermediate bias part 41 corresponds to the second write power Pm.

The recording data having a length of 5T or longer has the first recording pulse waveform. The amplitude of the top pulse 40 and the last pulse 42 corresponds to the first write power Ph and, on the other hand, the amplitude of the intermediate bias part 41 corresponds to the second write power Pm.

In the recording data having a length of 5T or longer, according to the length, the length of the intermediate bias part 41 increases. Although the pulse widths of the top pulse 40 and the last pulse 42 change more or less according to a control which will be described later, they are basically constant and do not largely change according to the recording pit length unlike the intermediate bias part 41.

In the recording pulse waveform of the first embodiment, as shown in FIGS. 5A and 5B, each of the top pulse 40 and the last pulse 42 has the leading and trailing edges in the pulse waveform. Unlike the conventional write strategy method, a plurality of pulses each having a small pulse width are not continued. The intermediate bias part 41 exists between the top pulse 40 and the last pulse 42. Consequently, the waveform is not improperly deformed by the influence of the leading and trailing periods of the pulses and the influence of overshoot and undershoot even at the time of high-speed recording.

In the first recording pulse waveform, more practically, to obtain excellent recording characteristics, so-called adjustment of the edge positions of the recording pulse waveform can be performed, in which the positions and the widths of the top pulse 40 and the last pulse 42 can be changed according to space lengths just before and after a pit to be recorded.

For the adjustment, for example, the method described in the paragraphs [0085] to [0108] in the Patent Document 1 and FIGS. 8 to 11 in the Patent Document 1 can be used.

Also with respect to the second recording pulse waveform, in a manner similar to the first recording pulse waveform, by adjusting the edge positions of the recording pulse, the influence of thermal interference and optical inter-symbol interference described in the Patent Document 1 can be eliminated. With respect to the front end of a pit to be recorded, in a manner similar to the first recording pulse waveform, it is sufficient to adjust a front edge position TF and a rear edge position TR of the top pulse 40 in a recording pulse corresponding to a pit to be recorded in accordance with the length of space just before the pit to be recorded On the other hand, with respect to the rear end of a pit to be recorded, the last pulse 42 does not exist, so that the length of the pit is finely adjusted by changing a rear edge position RE (refer to FIG. 5(b)) of a recording pulse in accordance with the length of a space after the pit to be recorded.

As described above, by the operation of the recording controller 10 of the first embodiment, only the recording pulse width corresponding to a pit having a length of 3T or 4T is set as the second recording pulse waveform, and the recording pulse waveform corresponding to a pit having a length of 5T or longer is set as the first recording pulse waveform. Consequently, a part recorded at the first write power Ph and a part recorded at the second write power Pm are included in the recording pulse waveforms having the overall length. Even in the case where the recording power fluctuates due to external factors and the like, the balance of pits does not deteriorate but excellent recording characteristics can be maintained.

Since the amplitude of the top pulse 40 in the first recording pulse waveform and that in the second recording pulse waveform are the same, recording pulses can be generated with a simple configuration.

Further, since the amplitude of the intermediate bias part 41 in the first recording pulse waveform and that in the second recording pulse waveform are the same, recording pulses can be generated with a simpler configuration.

Further, since the length ($T_{TOP}$) of the top pulse 40 in the second recording pulse waveform is set to be longer than the length ($T_{TOP}$) of the top pulse 40 in the first recording pulse waveform, time in which the amplitude in the second recording pulse waveform changes from a value corresponding to the first write power Ph to a value corresponding to the second write power Pm is longer than time in which the amplitude in the first recording pulse waveform changes from a value corresponding to the first write power Ph to a value corresponding to the second write power Pm. Therefore, after fluctuations in the amplitude in the second recording pulse waveform immediately after the amplitude changes to the value corresponding to the first write power Ph decrease, the amplitude changes to the value corresponding to the second write power Pm. As a result, the average fluctuation width of the amplitude control in the second recording pulse waveform can be suppressed to the minimum.

Figure 7:
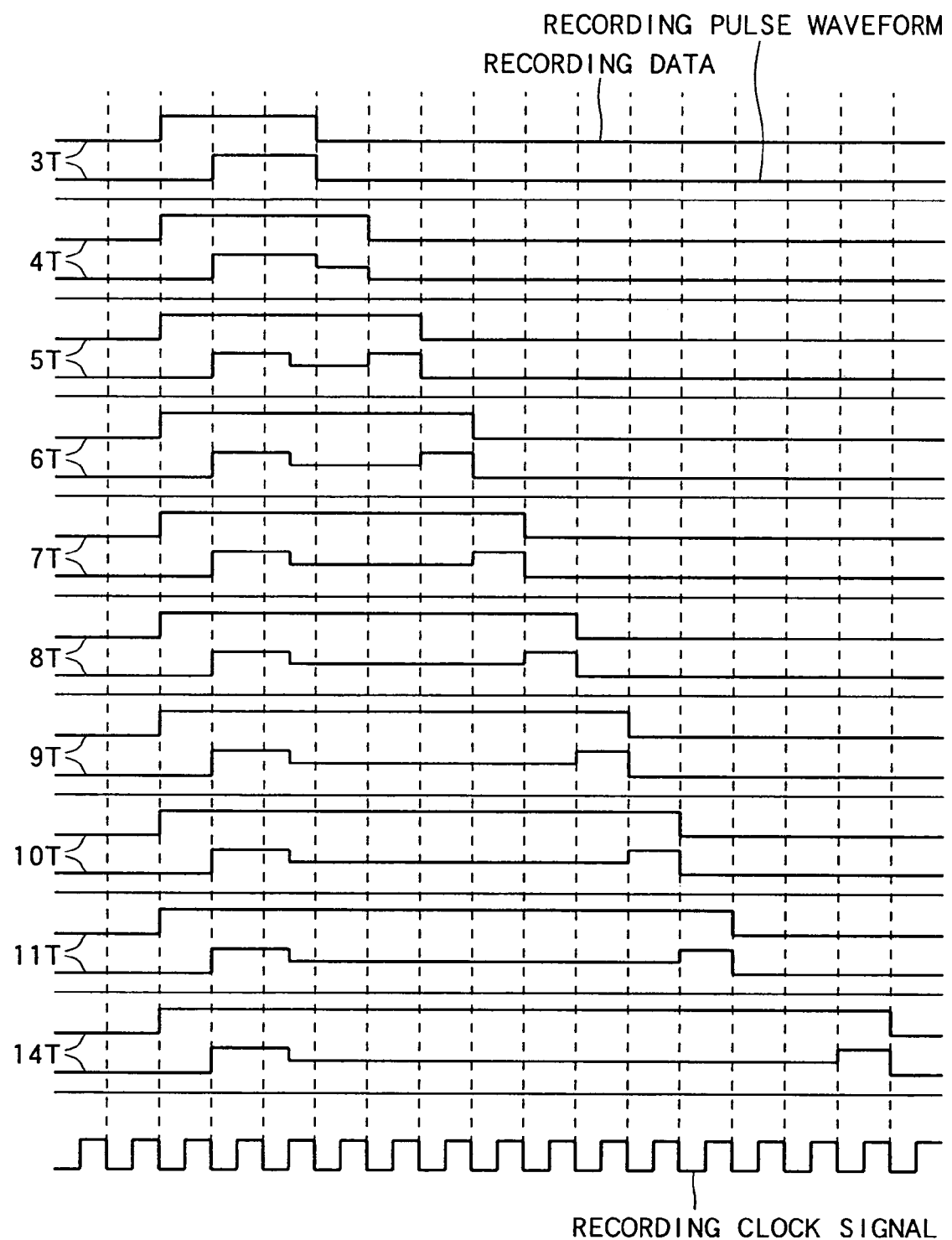
FIG. 7 is a diagram showing recording pulse waveforms corresponding to recording pits in a modification of the first embodiment.

In the first embodiment, as shown in FIG. 7, only the recording pulse waveform of 3T as the shortest recording pit may be set as a single pulse for the following reason. When 3T as the shortest recording pit is set as the second recording pulse waveform, depending on the performance of the LD driver for driving the laser diode, fluctuations in the waveform due to so-called overshoot, undershoot, or the like may not be converged during the pulse width period. From the viewpoint of properly controlling the pulse width, it is desirable to set the recording pulse waveform of 3T to the single pulse.

In FIG. 7, the recording power of the single pulse of 3T and that of the top pulse 40 in the recording pulse of 4T do not have to be set to the same but may be separately set so as to obtain the optimum recording characteristics in accordance with the lengths of spaces before and after a recording pit.

(III) Second Embodiment

Figure 8:
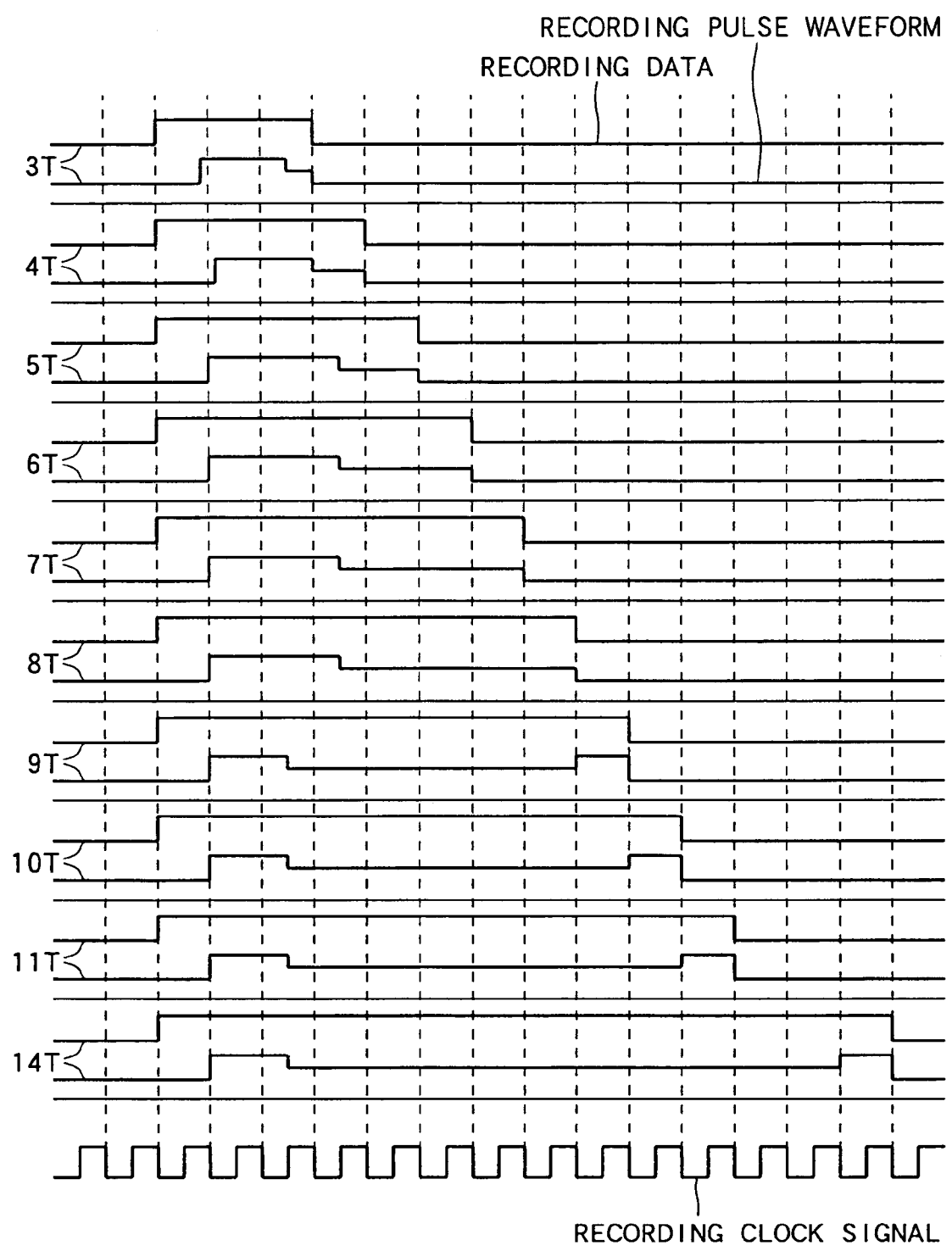
FIG. 8 is a diagram showing recording pulse waveforms corresponding to recording pits in a second embodiment.

A second embodiment as another embodiment of the write strategy method according to the present application, which is executed by the above-described information recording/reproducing apparatus 1 will be concretely described with reference to FIG. 8. FIG. 8 is a diagram showing recording pulse waveforms corresponding to recording pits in the second embodiment.

The configuration of the information recording/reproducing apparatus applied to the second embodiment of the write strategy method is basically the same as that of the information recording/reproducing apparatus 1 according to the first embodiment of the write strategy method. The description of the details will not be therefore repeated.

In the first embodiment of the write strategy method, the case where only the recording pulse waveform corresponding to a pit having the length of 3T or 4T (only the recording pulse waveform corresponding to a pit having the length of 4T in a modification (refer to FIG. 7) of the first embodiment) is set as the second recording pulse waveform and the recording pulse waveform corresponding to the pit having the length 5T or more is set as the first recording pulse waveform has been described. In the second embodiment of the write strategy method, the recording pulse waveforms corresponding to pits having lengths 3T to 8T are set as the second recording pulse waveforms, and the recording pulse waveform corresponding to a pit having a length of 9T or more is set as the first recording pulse waveform.

Specifically, in the second embodiment of the write strategy method, as shown in FIG. 8, in the case of recording data 3T to 8T, the second recording pulse waveform is set. The amplitude of the top pulse 40 corresponds to the first write power Ph. On the other hand, the amplitude of the intermediate bias part 41 corresponds to the second write power Pm.

According to the lengths of the recording data of 3T to 8T, the length of the intermediate bias part 41 increases. Although the pulse width of the top pulse 40 changes more or less under the control in a manner similar to the first embodiment, it is basically almost constant. The pulse width does not largely change according to the length of a recording pit unlike the intermediate bias part 41.

On the other hand, recording data having a length of 9T or longer has the first recording pulse waveform. The amplitude of the top pulse 40 and the last pulse 42 corresponds to the first write power Ph. On the other hand, the amplitude of the intermediate bias part 41 corresponds to the second write power Pm.

According to the length of recording data having a length of 9T or longer, the length of the intermediate bias part 41 increases. Although the pulse width of the top pulse 40 and the last pulse 42 changes more or less by a control similar to that in the first embodiment, it is basically almost constant and does not largely change according to the length of a recording pit unlike the intermediate bias part 41.

The range of lengths of pits corresponding to the second recording pulse waveform is set 3T to 8T in the second embodiment for the following reason. The maximum amplitude in a so-called eye pattern in an RF (Radio Frequency) signal detected from reflection light obtained by emitting a laser beam for reproduction to a formed recording pit is obtained from an RF signal detected from a recording pit having the length of 8T. It was experimentally found that it is the most desirable from the viewpoint of reproduction quality to set, as the second recording pulse waveform, a recording pulse waveform corresponding to a recording pit having a length equal to or less than the length of the recording pit having the length at which the maximum amplitude is obtained. However, the length of the recording pit at which the maximum amplitude is obtained changes depending on variations in the characteristic of the optical pickup itself, the quality of the material of the optical disc D, and the like. It is desirable to design and manufacture an information recording/reproducing apparatus by pre-setting, as the second recording pulse waveform, a recording pulse waveform corresponding to a recording pit having a length equal to or less than the length which is pre-set on the basis of various experiment results.

Since the other operation of the information recording/reproducing apparatus is the same as that of the information recording/reproducing apparatus 1 according to the first embodiment, description of the details will not be repeated.

As described above, in the operation of the recording controller of the second embodiment, the recording pulse waveform corresponding to the pits having a length in the range from 3T to 8T is set as the second recording pulse waveform, and the recording pulse waveform corresponding to a pit having a length equal to or longer than 9T is set as the first recording pulse. Consequently, a part recorded with the first write power Ph and a part recorded with the second write power Pm are included in the recording pulse waveforms of all of lengths. Even in the case where the length of a pit changes, the fluctuation width in the control of the amplitude of a recording pulse becomes almost constant. Thus, the accurate amplitude control can be performed on pits in all of the range of lengths.

Therefore, by uniforming and improving the accuracy of amplitude control accompanying a change in the length of a pit, a recording pit having a proper shape can be generated even at the time of ultra-high-speed recording of, for example, 8× or higher.

Since the amplitude of the top pulse 40 in the first recording pulse waveform and that in the second recording pulse waveform are set to the same, recording pulses can be generated with a simple configuration.

Further, since the amplitude of the intermediate bias part 41 in the first recording pulse waveform and that in the second recording pulse waveform are also set to the same, recording pulses can be generated with a simpler configuration.

Further, since the length ($T_{TOP}$) of the top pulse 40 in the second recording pulse waveform is set to be longer than the length ($T_{TOP}$) of the top pulse 40 in the first recording pulse waveform, time in which the amplitude in the second recording pulse waveform changes from a value corresponding to the first write power Ph to a value corresponding to the second write power Pm is longer than time in which the amplitude in the first recording pulse waveform changes from a value corresponding to the first write power Ph to a value corresponding to the second write power Pm. Therefore, after fluctuations in the amplitude in the second recording pulse waveform immediately after the amplitude changes to the value corresponding to the first write power Ph decrease, the amplitude changes to the value corresponding to the second write power Pm. As a result, the average fluctuation width of the amplitude control in the second recording pulse waveform can be suppressed to the minimum.

In the second embodiment, a recording pulse waveform corresponding to a pit having a length of 3T as the shortest pit may be set as a single pulse.

More practically, it is necessary to adjust the first and second write powers Ph and Pm on the basis of the ratio between the first and second write powers Ph and Pm and the like in each of the foregoing embodiments. As a concrete adjusting method, a method described in the paragraphs [0112] to [0131] in the Patent Document 1 and FIGS. 13 to 16 in the Patent Document 1 can be used.

The first write power Ph in the first pulse waveform and that in the second pulse waveform do not always have to be set to the same but may be set separately so that the optimum recording characteristic can be obtained according to variations in the characteristics of the optical pickup itself, the quality of the material of the optical disc D, and the like.

Similarly, the second write power Pm in the first pulse waveform and that in the second pulse waveform do not always have to be set to the same but may be set separately so as to obtain the optimum recording characteristic in accordance with variations in the characteristics of the optical pickup itself, the quality of the material of the optical disc D, and the like.

The invention claimed is:

1. A recording pulse generating apparatus for generating recording pulse signals having pulse widths corresponding to pits having various lengths, comprising:
   a first pulse generating device which generates the recording pulse signal so that an amplitude of the recording pulse signal corresponding to a pit having length less than a preset length changes from a first amplitude which is an amplitude of front end of the recording pulse signal to a second amplitude which is lower than the first amplitude and is an amplitude of rear end of the recording pulse signal; and
   a second pulse generating device which generates the recording pulse signal so that an amplitude of the recording pulse signal corresponding to a pit having a length equal to or longer than the preset length changes from a third amplitude which is an amplitude of front end of the recording pulse signal to a fourth amplitude lower than the third amplitude, and further changes to a fifth amplitude which is higher than the fourth amplitude and is an amplitude of rear end of the recording pulse signal,
   wherein the first and second pulse generating devices generate the recording pulse signals so that the first and third amplitudes become equal to each other, and
   wherein the first pulse generating device generates the recording pulse signal so that the amplitude of the recording pulse signal corresponding to the other kind of pits having a length less than the preset length becomes a sixth amplitude.

2. The recording pulse generating apparatus according to claim 1,
   wherein the second pulse generating device generates the recording pulse signal so that the third and fifth amplitudes become equal to each other.

3. The recording pulse generating apparatus according to claim 1,
   wherein the first and second pulse generating devices generates the recording pulse signals so that the second and fourth amplitudes become equal to each other.

4. The recording pulse generating apparatus according to claim 1,
   wherein the first pulse generating device generates the recording pulse signals so that the first amplitude and the sixth amplitude become equal to each other.

5. The recording pulse generating apparatus according to claim 1,
   wherein the first pulse generating device and the second pulse generating device generate the recording pulse signals so that time in which the amplitude of the recording pulse signal generated by the first pulse generating device is the first amplitude is longer than time in which the amplitude of the recording pulse signal generated by the second pulse generating device is the third amplitude.

6. An information recording apparatus comprising:
   the recording pulse generating apparatus according to claim 1, and
   a recording device which records the information by forming the pit using the recording pulse signal generated.

7. An information recording method of forming a pit by using a generated recording pulse signal, and recording information on an information recording medium,
   said method comprising:
   a first pulse generating process of generating the recording pulse signal so that an amplitude of the recording pulse signal corresponding to a pit having length less than a preset length changes from a first amplitude which is an amplitude of front end of the recording pulse signal to a second amplitude which is lower than the first amplitude and is an amplitude of rear end of the recording pulse signal;
   a second pulse generating process of generating the recording pulse signal so that an amplitude of the recording pulse signal corresponding to a pit having a length equal to or longer than the preset length changes from a third amplitude which is an amplitude of front end of the recording pulse signal to a fourth amplitude lower than the third amplitude, and further changes to a fifth amplitude which is higher than the fourth amplitude and is an amplitude of rear end of the recording pulse signal, and
   a recording process of forming the pit by using the generated recording pulse signal, and recording the information,
   wherein in the first and second pulse generating processes, the recording pulse signals are generated so that the first and third amplitudes become equal to each other, and
   wherein in the first pulse generating process, the recording pulse signal is generated so that the amplitude of the recording pulse signal corresponding to the other kind of pits having a length less than the preset length becomes a sixth amplitude.

* * * * *